(12) United States Patent
Zhou

(10) Patent No.: US 9,335,460 B1
(45) Date of Patent: May 10, 2016

(54) LIGHT GUIDE PLATE, BACKLIGHT MODULE, AND DISPLAY DEVICE

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 2 days.

(21) Appl. No.: 14/416,782

(22) PCT Filed: Dec. 16, 2014

(86) PCT No.: PCT/CN2014/093938
§ 371 (c)(1),
(2) Date: Jan. 23, 2015

(30) Foreign Application Priority Data

Dec. 2, 2014 (CN) .......................... 2014 1 0723100

(51) Int. Cl.
*G02F 1/1333* (2006.01)
*F21V 8/00* (2006.01)
(52) U.S. Cl.
CPC ............ *G02B 6/0055* (2013.01); *G02B 6/0045* (2013.01); *G02B 6/0068* (2013.01); *G02B 6/0088* (2013.01)
(58) Field of Classification Search
CPC .. G02B 6/0055; G02B 6/0045; G02B 6/0068; G02B 6/0088; G02B 6/0038; G02B 6/0036; G02B 6/0046; G02B 6/0021; G02F 1/133615; G02F 1/166303–1/133604; G02F 1/133608

USPC .......... 362/23.09, 23.16, 600, 602–603, 608, 362/610, 615, 628; 349/61, 65
See application file for complete search history.

(56) References Cited

U.S. PATENT DOCUMENTS

| | | | | |
|---|---|---|---|---|
| 2009/0016057 A1* | 1/2009 | Rinko | .................. | G02B 6/0016 362/268 |
| 2012/0050649 A1* | 3/2012 | Yeo | ........................ | G02B 6/002 349/65 |
| 2013/0235300 A1* | 9/2013 | Zhou | ..................... | G02B 6/0068 349/62 |
| 2013/0258716 A1* | 10/2013 | Fang | ....................... | G09F 13/04 362/613 |

\* cited by examiner

*Primary Examiner* — Anne Hines
*Assistant Examiner* — Jose M Diaz
(74) *Attorney, Agent, or Firm* — Andrew C. Cheng

(57) ABSTRACT

Disclosed is a light guide plate for use in a backlight module. The light guide plate includes a light incidence surface, a light exit surface, and a bottom surface opposite to the light exit surface. The light incidence surface is connected between the bottom surface and the light exit surface. The light guide plate has an interior in which an internal chamber is formed and includes two opposite sidewalls and an end wall that is connected between the two sidewalls and is substantially parallel to and spaced from the light incidence surface. The internal chamber include a light source provided at a connection site between the end wall and each of the two sidewalls, whereby light that enters through the light incidence surface and light emitting from the two light sources are subjected to refraction and/or reflection within the internal chamber and then project outward through the light exit surface.

10 Claims, 2 Drawing Sheets

LIGHT GUIDE PLATE, BACKLIGHT MODULE, AND DISPLAY DEVICE

CROSS REFERENCE TO RELATED APPLICATIONS

This application claims the priority of Chinese Patent Application No. 201410723100.7, entitled "Light Guide Plate, Backlight Module, and Display Device", filed on Dec. 2, 2014, the disclosure of which is incorporated herein by reference in its entirety.

BACKGROUND OF THE INVENTION

1. Field of the Invention

The present invention relates to the field of liquid crystal displaying technology, and in particular to a light guide plate, a backlight module, and a display device.

2. The Related Arts

Currently, liquid crystal displays that function as display components of electronic devices have been widely used in various electronic products. These electronic products have bezels that are getting thinner and also, brightness has been increasingly demanded to be higher, but has at the same time satisfied the requirement for power saving. A backlight module is an important component of the liquid crystal displays.

The backlight module comprises a light guide plate, a mold frame set around a circumference of the light guide plate, a light source, a flexible circuit board, and an optic film. The light source and the flexible circuit board are fixed by light-shielding adhesive tapes on the light guide plate and the mold frame. For a side-edge backlight module, the light emitting from the light source gets into the light guide plate through a side edge of the light guide plate and then, the light is reflected by the light guide plate to project out of a light exit surface. A portion of the light is reflected by a reflection plate so as to project out through the light exit surface.

However, in the prior art, when a light beam passes through the light guide plate to project outward, an amount of 8% of the light energy is absorbed by the light guide plate and is thus lost so that the screen brightness is lowered down. The lost light energy can only be supplemented by using optic films of which the gain is increased to around 10% and this increases the manufacturing cost.

SUMMARY OF THE INVENTION

A technical issue to be addressed in the present invention is to provide a light guide plate, wherein the light guide plate can reduce the loss of light energy and thus lower down the manufacturing cost.

The present invention also provides a backlight module and a display device.

To achieve the above object, the present invention provides the following technical solutions:

The present invention provides a light guide plate for use in a backlight module. The light guide plate comprises a light incidence surface, a light exit surface, and a bottom surface opposite to the light exit surface. The light incidence surface is connected between the bottom surface and the light exit surface. The light guide plate has an interior in which an internal chamber is formed. The internal chamber comprises two opposite sidewalls and an end wall connected between the two sidewalls. The end wall is substantially parallel to the light incidence surface and spaced from the light incidence surface. The internal chamber comprises a light source provided at a connection site between the end wall and each of the two sidewalls, whereby light that enters through the light incidence surface and light emitting from the two light sources are subjected to refraction and/or reflection within the internal chamber and then project outward through the light exit surface.

In the above light guide plate, the two sidewalls and the end wall have surfaces that are curved surfaces.

In the above light guide plate, the surfaces of the two sidewalls and the end wall are provided with reflective coating layers.

In the above light guide plate, the surfaces of the two sidewalls and the end wall are formed by arranging a plurality of spherical faces or a plurality of rhombus faces.

In the above light guide plate, the surfaces of the two sidewalls and the end wall are formed by arranging conic bodies.

A backlight module comprises a backplane, a lighting source, an optic film, and a light guide plate, wherein the light guide plate comprises a light incidence surface, a light exit surface, and a bottom surface opposite to the light exit surface, the light incidence surface connected between the bottom surface and the light exit surface, the light guide plate having an interior in which an internal chamber is formed, the internal chamber comprising two opposite sidewalls and an end wall connected between the two sidewalls, the end wall being substantially parallel to the light incidence surface and spaced from the light incidence surface, the internal chamber comprising a light source provided at a connection site between the end wall and each of the two sidewalls, whereby light that enters through the light incidence surface and light emitting from the two light sources are subjected to refraction and/or reflection within the internal chamber and then project outward through the light exit surface; and the light guide plate is stacked on the backplane, the optic film being disposed on the light exit surface, the lighting source facing the light incidence surface of the light guide plate.

In the above backlight module, the backplane comprises a bottom board and a side board and the light guide plate is fixed by double-sided adhesive tape to the backplane.

In the above backlight module, a reflection plate is arranged between the bottom board and the light guide plate.

In the above backlight module, the two sidewalls and the end wall have surfaces that are curved surfaces.

A display device comprises a backlight module and a liquid crystal panel, the backlight module comprising backplane, a lighting source, an optic film, and a light guide plate, wherein the light guide plate comprises a light incidence surface, a light exit surface, and a bottom surface opposite to the light exit surface, the light incidence surface connected between the bottom surface and the light exit surface, the light guide plate having an interior in which an internal chamber is formed, the internal chamber comprising two opposite sidewalls and an end wall connected between the two sidewalls, the end wall being substantially parallel to the light incidence surface and spaced from the light incidence surface, the internal chamber comprising a light source provided at a connection site between the end wall and each of the two sidewalls, whereby light that enters through the light incidence surface and light emitting from the two light sources are subjected to refraction and/or reflection within the internal chamber and then project outward through the light exit surface; the light guide plate is stacked on the backplane, the optic film being disposed on the light exit surface, the lighting source facing the light incidence surface of the light guide plate; and the liquid crystal panel is arranged above the backlight module and the liquid crystal panel and the optic film are fixed to each other through double-sided adhesive tape.

The present invention provides a light guide plate of a backlight module, which comprises an internal chamber formed therein. The internal chamber is provided with a light source at a side thereof that is distant from the light incidence surface, whereby light from an external light, when entering through the light incidence surface, is combined with light from the light source arranged inside the internal chamber to be subjected to refraction and/or reflection by the internal chamber and then project out through a light exit surface. This reduces the amount of light energy absorbed by the light guide plate itself and also increases the brightness for the light projecting from the light exit surface so as to increase the brightness of an image and also reduce the cost of the light guide plate.

BRIEF DESCRIPTION OF THE DRAWINGS

To more clearly illustrate the technical solutions proposed in the present invention, a brief description of the drawings that are necessary for describing embodiments of the present invention is given below. It is obvious that the drawings that will be described below show only some embodiments of the present invention and for those having ordinary skills of the art, other drawings may also be readily available from these attached drawings without the expense of creative effort and endeavor.

DETAILED DESCRIPTION OF THE PREFERRED EMBODIMENTS

A clear and complete description will be given to technical solutions of the embodiments of the present invention with reference to the attached drawings of the embodiments of the present invention.

Figure 1:
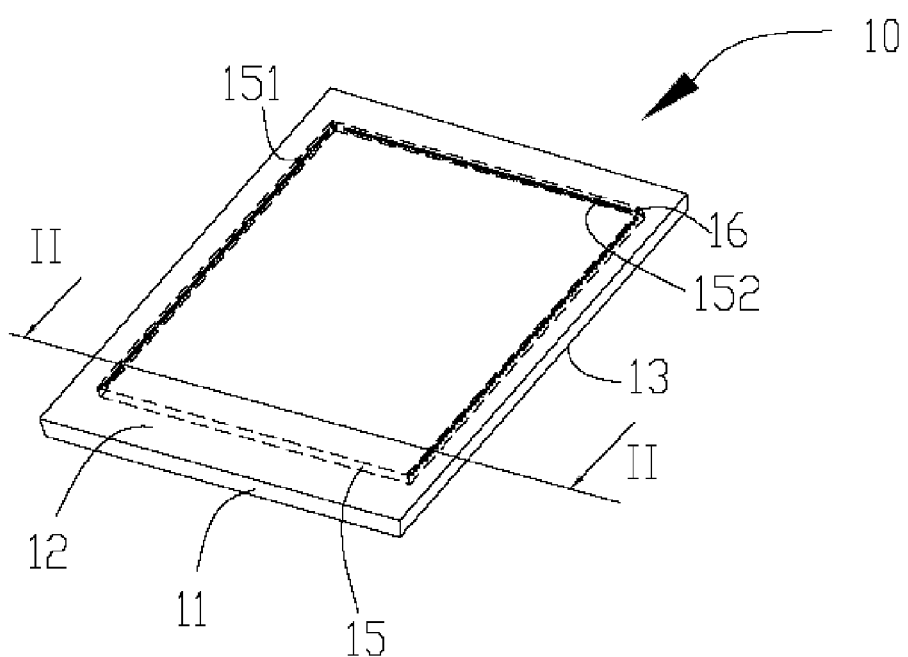
FIG. 1 is a schematic view showing the structure of a light guide plate according to a preferred embodiment of the present invention.
Figure 2:
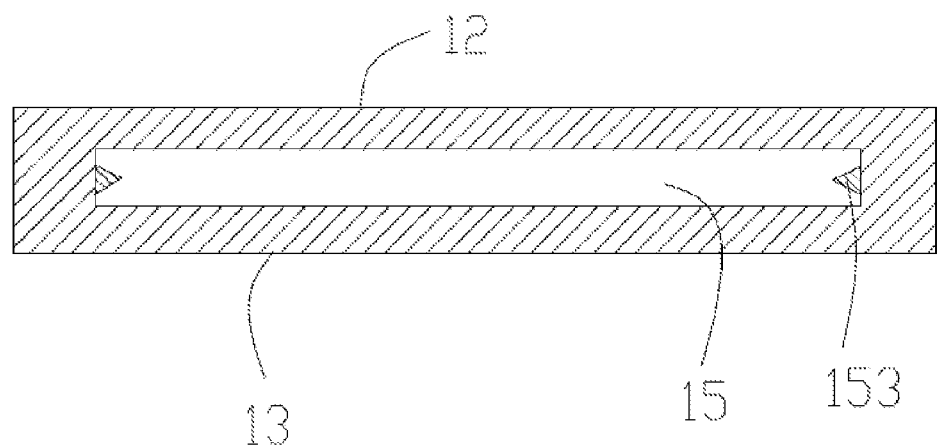
FIG. 2 is a schematic cross-sectional view showing a backlight module according to the present invention taken along line II-II of FIG. 1.
Figure 3:
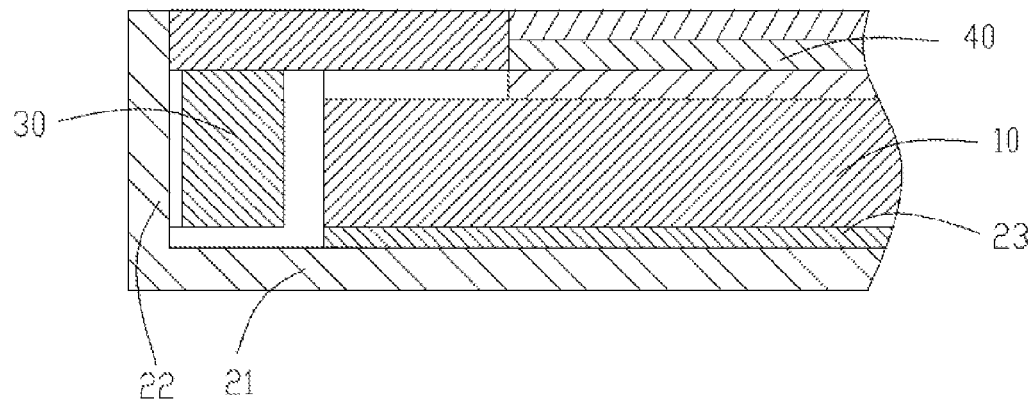
FIG. 3 is a schematic cross-sectional view showing a backlight module of FIG. 1 taken from another direction.

Referring to FIGS. 1, 2, and 3, a preferred embodiment of the present invention provides a light guide plate 10 for use in a backlight module. The light guide plate 10 comprises a light incidence surface 11, a light exit surface 12 and a bottom surface 13 opposite to the light exit surface 12. The light incidence surface 11 is connected between the bottom surface 13 and the light exit surface 12. The light guide plate 10 has an interior in which an internal chamber 15 is formed. The internal chamber 15 comprises two opposite sidewalls 151 and an end wall 152 connected between the two sidewalls 151. The end wall 152 is substantially parallel to the light incidence surface 11 and is spaced from the light incidence surface 11. The internal chamber 15 comprises a light source 16 provided at a connection site between the end wall 152 and each of the two sidewalls 151. Light that is incident on and enters through the light incidence surface 11 and light emitting from the two light sources 16 are subjected to refraction and/or reflection within the internal chamber 15 and then project outward through the light exit surface 12.

In the instant embodiment, the light guide plate 10 is a rectangular plate. The light guide plate 10 is integrally formed as a unitary member having a hollow interior that forms the internal chamber 15. Two sides of the light guide plate 10 that are parallel to the two sidewalls 151 are provided with multiple sequentially arranged receiving slots 16. The receiving slots 16 extend through the light guide plate for receiving and holding therein light sources of a backlight module.

FIG. 1 is a schematic view showing the structure of the light guide plate according to a preferred embodiment of the present invention, in which phantom lines indicate a contour of the internal chamber and a contour of conic bodies that form a curved surface. Surfaces of the two sidewalls 151 and the end wall 152 are curved surfaces. And, the surfaces of the two sidewalls 151 and the end wall 152 are provided with reflective coating layers. The reflective coating layers enhance reflection effect of the surfaces.

The two light sources 16 are light-emitting diodes, which are respectively mounted at the connection sites between the two sidewalls 151 and the end wall 152 and emit light that is reflected or refracted by the surfaces of the two sidewalls 151 and the end wall 152 to project out through the light exit surface 12 in order to increase intensity of light guided by the light guide plate.

Further, the surfaces of the two sidewalls 151 and the end wall 152 are formed by arranging a plurality of hemispheric faces or a plurality of rhombus faces. Or alternatively, the surfaces of the two sidewalls 151 and the end wall 152 are formed by arranging conic bodies. In the instant embodiment, the surfaces of the two sidewalls 151 and the end wall 152 comprises curved surfaces formed by arranging conic bodies 153.

A preferred embodiment of the present invention also provides a backlight module. The backlight module comprises a light guide plate 10, a backplane 20, a lighting source 30, and an optic film 40. The light guide plate 10 is stacked on the backplane 20. The optic film 40 is disposed on the light exit surface 12 and is fixed by a double-sided adhesive tape. The lighting source 30 faces the light incidence surface 11 of the light guide plate 10. Light from the lighting source 30 transmits through the two sidewalls 151 of the internal chamber 15 to enter the light guide plate.

In the instant embodiment, the backplane 20 comprises a bottom board 21 and a side board 22. The light guide plate 10 is fixed by double-sided adhesive tape to the backplane 20.

In the instant embodiment, a reflection plate 23 is arranged between the bottom board 21 and the light guide plate 10.

The present invention further provides a display device (not shown). The display device comprises a backlight module and a liquid crystal panel. The liquid crystal panel is arranged above the backlight module and the liquid crystal panel and the optic film are fixed to each other through double-sided adhesive tape.

The present invention provides a light guide plate of a backlight module, which comprises an internal chamber formed therein. The internal chamber is provided with a light source at a side thereof that is distant from the light incidence surface, whereby light from an external light, when entering through the light incidence surface, is combined with light from the light source arranged inside the internal chamber to be subjected to refraction and/or reflection by the internal chamber and then project out through a light exit surface. This reduces the amount of light energy absorbed by the light guide plate itself and also increases the brightness for the light projecting from the light exit surface so as to increase the brightness of an image and also reduce the cost of the light guide plate.

Disclosed above are only the preferred embodiments of the present invention. It is appreciated that those having ordinary skills of the art may readily appreciate various improvements and modifications without departing from the principle of the present invention and these improvements and modifications are considered within the protection scope of the present invention.

What is claimed is:

1. A light guide plate for use in a backlight module, comprising a light incidence surface, a light exit surface, and a bottom surface opposite to the light exit surface, the light incidence surface connected between the bottom surface and the light exit surface, the light guide plate having an interior in which an internal chamber is formed, the internal chamber comprising two opposite sidewalls and an end wall connected between the two sidewalls, the end wall being substantially parallel to the light incidence surface and spaced from the light incidence surface, the internal chamber comprising a light source provided at a connection site between the end wall and each of the two sidewalls, whereby light that enters through the light incidence surface and light emitting from the two light sources are subjected to refraction and/or reflection within the internal chamber and then project outward through the light exit surface.

2. The light guide plate as claimed in claim 1, wherein the two sidewalls and the end wall have surfaces that are curved surfaces.

3. The light guide plate as claimed in claim 2, wherein the surfaces of the two sidewalls and the end wall are provided with reflective coating layers.

4. The light guide plate as claimed in claim 2, wherein the surfaces of the two sidewalls and the end wall are formed by arranging a plurality of spherical faces or a plurality of rhombus faces.

5. The light guide plate as claimed in claim 2, wherein the surfaces of the two sidewalls and the end wall are formed by arranging conic bodies.

6. A backlight module, comprising a backplane, a lighting source, an optic film, and a light guide plate, wherein the light guide plate comprises a light incidence surface, a light exit surface, and a bottom surface opposite to the light exit surface, the light incidence surface connected between the bottom surface and the light exit surface, the light guide plate having an interior in which an internal chamber is formed, the internal chamber comprising two opposite sidewalls and an end wall connected between the two sidewalls, the end wall being substantially parallel to the light incidence surface and spaced from the light incidence surface, the internal chamber comprising a light source provided at a connection site between the end wall and each of the two sidewalls, whereby light that enters through the light incidence surface and light emitting from the two light sources are subjected to refraction and/or reflection within the internal chamber and then project outward through the light exit surface; and the light guide plate is stacked on the backplane, the optic film being disposed on the light exit surface, the lighting source facing the light incidence surface of the light guide plate.

7. The backlight module as claimed in claim 6, wherein the backplane comprises a bottom board and a side board, the light guide plate being fixed by double-sided adhesive tape to the backplane.

8. The backlight module as claimed in claim 6, wherein a reflection plate is arranged between the bottom board and the light guide plate.

9. The backlight module as claimed in claim 6, wherein the two sidewalls and the end wall have surfaces that are curved surfaces.

10. A display device, comprising a backlight module and a liquid crystal panel, the backlight module comprising backplane, a lighting source, an optic film, and a light guide plate, wherein the light guide plate comprises a light incidence surface, a light exit surface, and a bottom surface opposite to the light exit surface, the light incidence surface connected between the bottom surface and the light exit surface, the light guide plate having an interior in which an internal chamber is formed, the internal chamber comprising two opposite sidewalls and an end wall connected between the two sidewalls, the end wall being substantially parallel to the light incidence surface and spaced from the light incidence surface, the internal chamber comprising a light source provided at a connection site between the end wall and each of the two sidewalls, whereby light that enters through the light incidence surface and light emitting from the two light sources are subjected to refraction and/or reflection within the internal chamber and then project outward through the light exit surface; the light guide plate is stacked on the backplane, the optic film being disposed on the light exit surface, the lighting source facing the light incidence surface of the light guide plate; and the liquid crystal panel is arranged above the backlight module and the liquid crystal panel and the optic film are fixed to each other through double-sided adhesive tape.

\* \* \* \* \*